(12) United States Patent
Sell

(10) Patent No.: US 8,376,758 B2
(45) Date of Patent: Feb. 19, 2013

(54) RECEPTACLE WITH PRINTED CIRCUIT BOARD

(75) Inventor: Edward D. Sell, Iola, KS (US)

(73) Assignee: Tramec, L.L.C., Iola, KS (US)

( * ) Notice: Subject to any disclaimer, the term of this patent is extended or adjusted under 35 U.S.C. 154(b) by 0 days.

(21) Appl. No.: 12/882,042

(22) Filed: Sep. 14, 2010

(65) Prior Publication Data

US 2012/0064739 A1    Mar. 15, 2012

(51) Int. Cl.
*H01R 33/00*    (2006.01)
(52) U.S. Cl. .......... 439/35; 439/34; 439/76.2; 439/76.1
(58) Field of Classification Search ............... 439/272, 439/135, 138, 76.1, 34, 35, 76.2
See application file for complete search history.

(56) References Cited

U.S. PATENT DOCUMENTS

| | | | |
|---|---|---|---|
| 5,385,476 A * | 1/1995 | Jasper | 439/38 |
| 5,785,532 A * | 7/1998 | Maue et al. | 439/34 |
| 6,450,833 B1 * | 9/2002 | Brown et al. | 439/518 |
| 6,863,566 B2 * | 3/2005 | Scheuerer | 439/587 |
| 7,491,065 B2 * | 2/2009 | Wagner | 439/35 |
| 7,967,617 B2 * | 6/2011 | Vonnegut et al. | 439/142 |
| 2010/0029097 A1 * | 2/2010 | Burlak et al. | 439/35 |

* cited by examiner

*Primary Examiner* — Javaid Nasri
(74) *Attorney, Agent, or Firm* — Winston & Strawn LLP

(57) ABSTRACT

A receptacle, comprising, a sleeve provided with a plurality of electrical connections, a terminal assembly that is electrically connected to a wiring interface, the wiring interface is provided with a seal that resists the entry of moisture, a container that is provided with a nose box and a retractable cover; and a circuit board assembly that includes a trace that carries electrical current.

18 Claims, 8 Drawing Sheets

RECEPTACLE WITH PRINTED CIRCUIT BOARD

FIELD

Embodiments disclosed herein relate to electrical connections between tractors and trailers.

BACKGROUND

Tractor-trailer electrical connectors are known and are often referred to as "receptacles" or referred to by the applicable industry standard, (e.g. the SAE "J560 connector"). Though receptacles have been used for many years, existing receptacles are complicated to assemble with multiple stampings, pins and wires all held together by a myriad of fasteners. As a result, many receptacles used with tractor-trailers lack an easy-to-assemble modular design.

An example of a receptacle is shown in FIGS. 4, 5, and 9 of U.S. Pat. No. 6,450,833. FIGS. 4, 5, and 9, of U.S. Pat. No. 6,450,833 as well as the detailed description associated with FIGS. 4, 5, and 9 are incorporated herein by reference. Though the connector of U.S. Pat. No. 6,450,833 represents an acceptable solution to the problem of complicated assembly, it utilizes stampings and hooped wire ends held in place by multiple fasteners (such as the threaded studs designated "38" in FIG. 6). The specialized tooling and labor involved in manufacturing the receptacle of U.S. Pat. No. 6,450,833 are readily apparent, and hence, there is room for improvement.

The present invention uses a printed circuit board that need only be slid into place. Electrical connections are created by simply pushing electrical elements (such as circuit breakers and wires) into place on electrical pins. Electrical circuits are created on the printed circuit board via traces. Thus, a simplified and easy-to-assemble connector is created.

The present invention reduces installation labor and errors in assembly factory. Many trailer fleet owners request that the connectors used on their trailers provide electrical circuit overload protection. In those situations a separate in-line bank of circuit breakers contained in a junction box must be inserted separately from the SAE J560 connector, or another form of SAE J560 seven-way connector is supplied. The present invention integrates these circuit breakers into a standard size receptacle. The dimensions of the receptacle disclosed in FIGS. 3 and 6 (in inches) allow mounting compatibility with dimensions in wide use. Accordingly, the preferred embodiment is a seven-terminal receptacle configured to mate with an electrical connector extending from a highway tractor, according to an industry standard interface geometry (which in the preferred embodiment is the SAE J560 standard).

When circuit breakers are used, each harness lead must be connected to the appropriate terminal post of the circuit breaker for the correct circuit, external to the enclosure. This can lead to mistakes such as mismatched leads on the receptacle pin-load assignments, and short circuits or damaged leads when the receptacle assembly carrying the circuit breakers is mounted into the adapter box enclosure. It is even possible to by-pass the circuit protection if the harness lead is attached to the incorrect post of the breaker assembly.

The circuit breakers used are known as auto-resetting. These devices function by electrically opening the circuit if an attached electrical load exceeds the rated capacity of the device. This disconnect is accomplished by a heat sensitive bi-metal assembly that flexes to open the electrical contacts of the circuit breaker when a trigger temperature is reached. Unlike fuses, which are sacrificed by the function of protecting the circuit, the circuit breakers may be reset once the device cools and overload is repaired.

There are three general types of circuit breakers in use by the automotive and trucking industry. One type must be manually reset; yet another circuit breaker automatically resets after electrical power has been removed from the circuit. A third type of circuit breaker continually opens and closes as the device reacts to heat caused by the overloads (referred to as an "SAE Type I" circuit breaker). When an SAE Type I circuit breaker is overloaded, the vehicle's lights continually cycle on and off (blink) with the open/closed cycling of the circuit breaker. Thus, the vehicle remains visible to other traffic at night and the operator is alerted to the overload.

Unfortunately, if the operator fails to repair the cause of the overload, the SAE Type I circuit breaker will eventually fail due to mechanical fatigue or contact welding. It may fail in an electrically open or safe condition. However, if the device fails due to the welding of the contacts, the electrical circuit is permanently closed and the attached circuits are no longer protected. The present invention illustrated in the figures addresses these issues.

The receptacle constituting the presently preferred embodiment is delivered fully assembled and closed, ready to mount on the vehicle. No user work is required inside the enclosure. Installation amounts to positioning the assembly on mounting bolts pre-installed on the vehicle, tightening the mounting nuts, and snapping the harness connector into the mating 12-pin receiver (shown in FIG. 8) on the lower face of the box. This electrical connection is a commercially available device, providing a water-tight connection with alignment and locking features to ensure that the harness leads are properly oriented, seated, and sealed. This eliminates potential mis-wiring in the assembly plant or by the vehicle owner, and reduces the installation time.

Of course, the foregoing represents one of the advantages of the present invention; other advantages will be apparent to one of ordinary skill in the art after reading the following written description and the figures associated therewith.

SUMMARY

The scope of the present invention is defined solely by the appended claims, and is not affected to any degree by the statements within this summary. Disclosed herein are embodiments of A receptacle, comprising, a sleeve provided with a plurality of electrical connections, a terminal assembly that is electrically connected to a wiring interface, the wiring interface is provided with a seal that resists the entry of moisture, a container that is provided with a nose box and a retractable cover; and a circuit board assembly that includes a trace that carries electrical current.

WRITTEN DESCRIPTION

Figure 1:
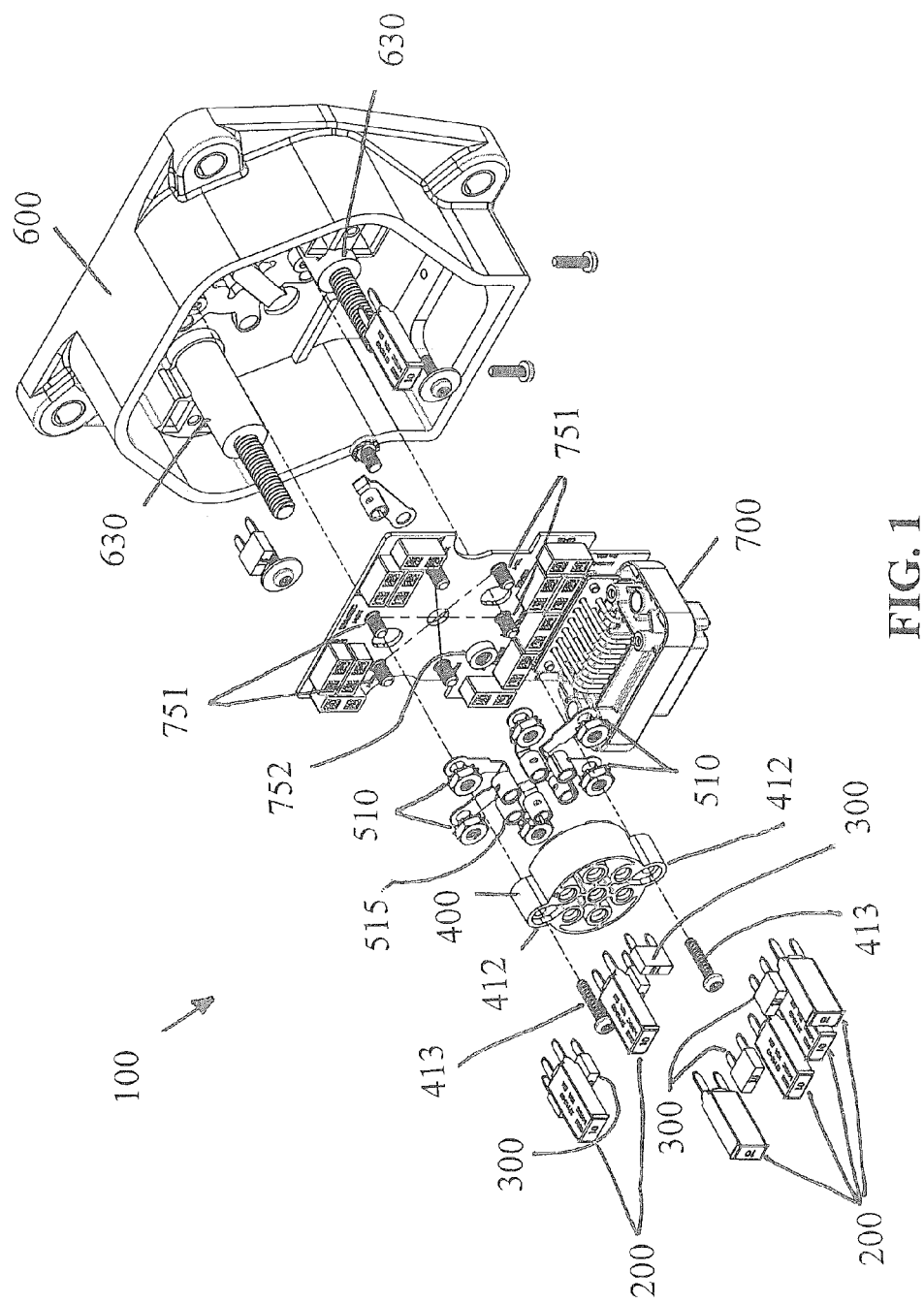
FIG. 1 depicts and exploded view of a receptacle.

FIG. 1 depicts an exploded view of a receptacle 100 constituting a presently preferred embodiment of the invention claimed herein. As illustrated, the receptacle 100 is provided with a plurality of serviceable circuit breakers (collectively designated "200") a plurality of serviceable fuses (collectively designated "300"), a sleeve 400, a terminal assembly 500, a container 600 including a cover 610 (which container is further shown in FIG. 2), a circuit board assembly 700, and a connector 800.

Figure 2:
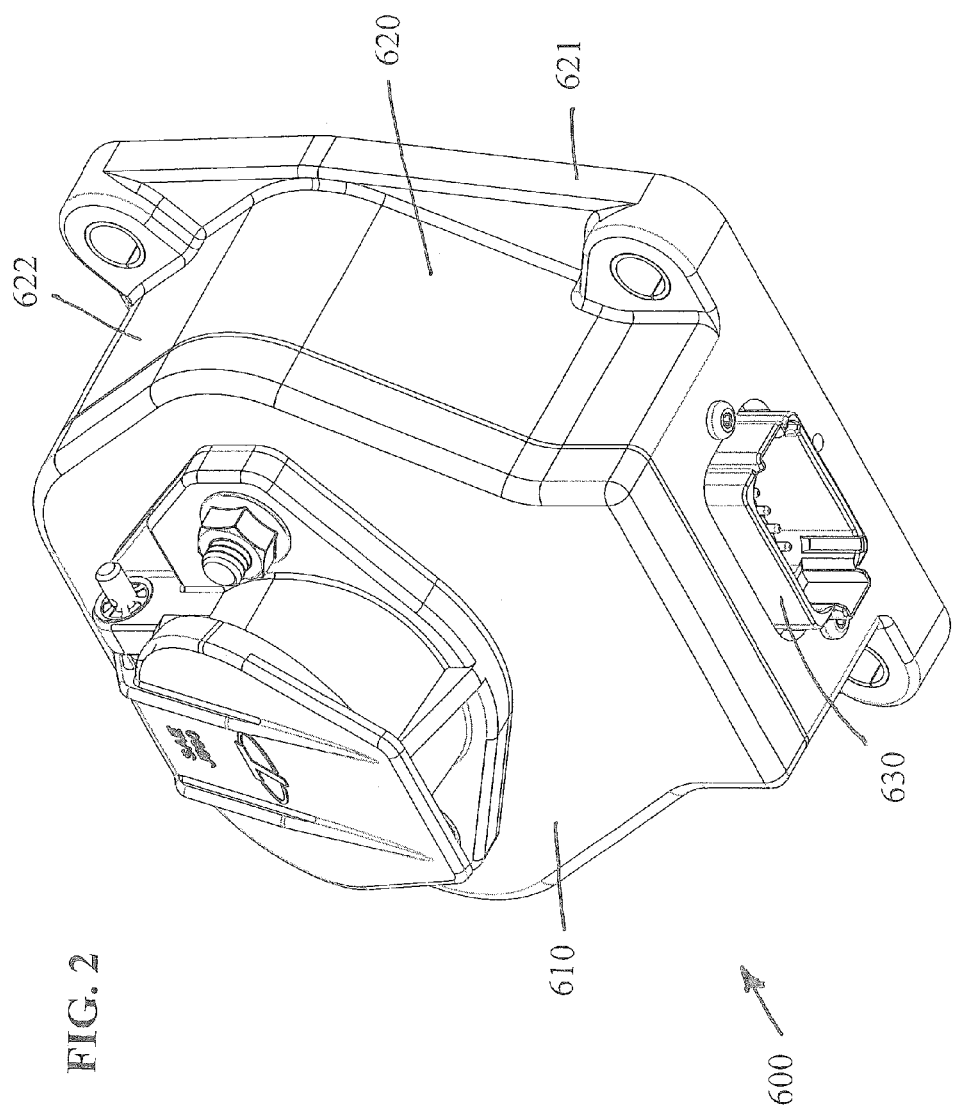
FIG. 2 depicts a perspective view of a container.
Figure 3:
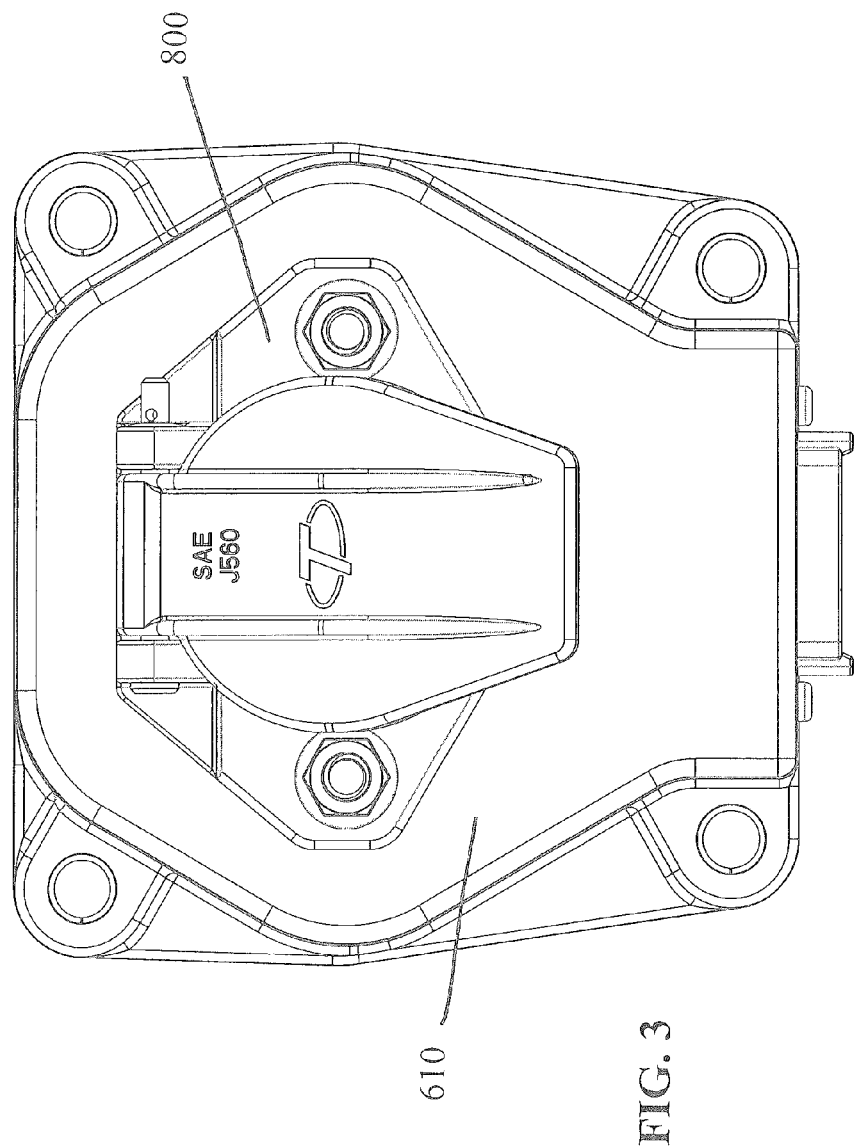
FIG. 3 depicts a cover on the container.

As noted parenthetically above, FIG. 2 depicts the container 600. As illustrated in FIG. 2, the container 600 is provided with a cover 610, a base (which has been generally designated via an arrow as "620"), and an opening 630 for a connector such as a third party harness connector as described hereinbelow. The base 620 is provided with a plate 621 that is generally flat and that extends along a plane extending from the plate 621. Generally orthogonally relative the plane of the plate 621 is a side 622. The side 622 of the base 620 (and hence the base 620 itself) is provided with the opening 630. While the presently preferred embodiment is provided with a base 620 that includes an opening 630, one of skill in the art will appreciate that the cover 610 may be provided with a side and an opening for a connector.

Figure 6:
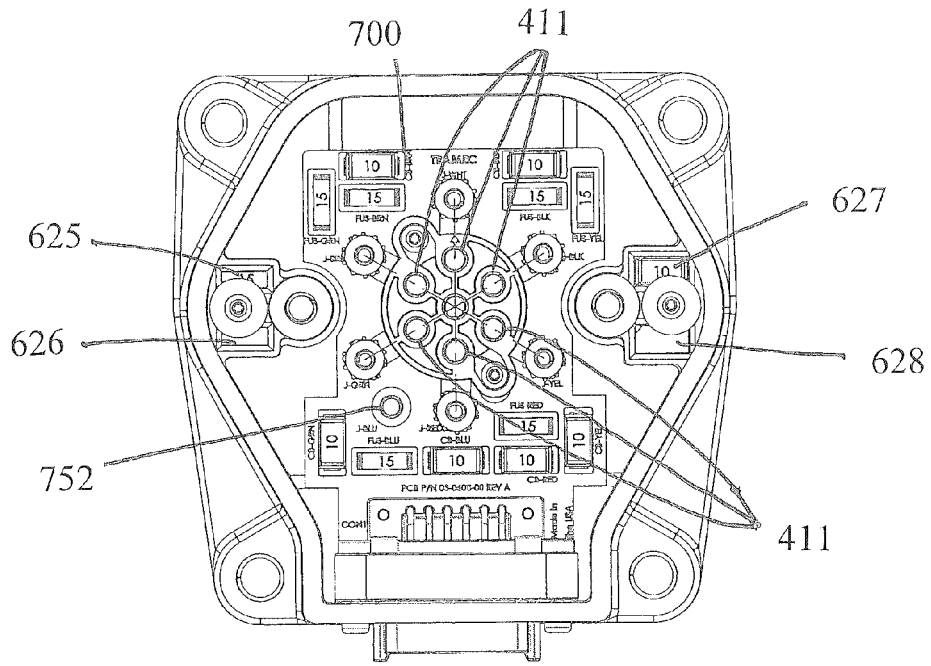
FIG. 6 depicts container holding in place a printed circuit board.

Referring now to FIG. 6, the plate 621 of the base 620 is provided with a bin, and preferably a plurality of bins 625, 626, 627, 628 that have been shaped to store spare parts. According to one aspect, at least one of the bins 625, 626, 627, 628 is shaped to retain a fuse; according to another, at least one of the bins 625, 626, 627, 628 is shaped to retain a circuit breaker.

Figure 5:
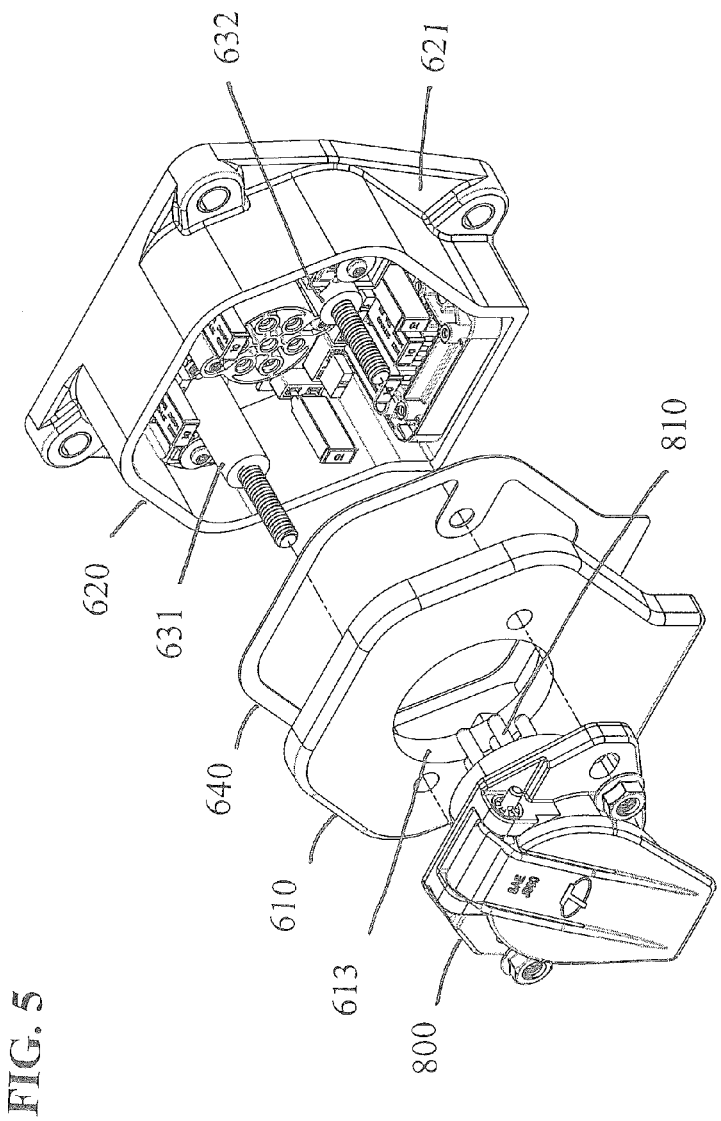
FIG. 5 depicts and exploded view of the container.

The plate 621 is also provided with a plurality of fastener structures (examples of which have been designated "631" and "632" in FIG. 5). As FIG. 5 illustrates, the fastener structures 631, 632 extend orthogonally from the base 620 and are shaped to accept a male-threaded fastener (which in the case of the preferred embodiment, is cylindrically shaped). Advantageously, the male-threaded fasteners are insert-molded into the base 620. To provide a water tight seal, a gasket 640 is disposed between the base 620 and the cover 610, as FIG. 5 illustrates.

Figure 4:
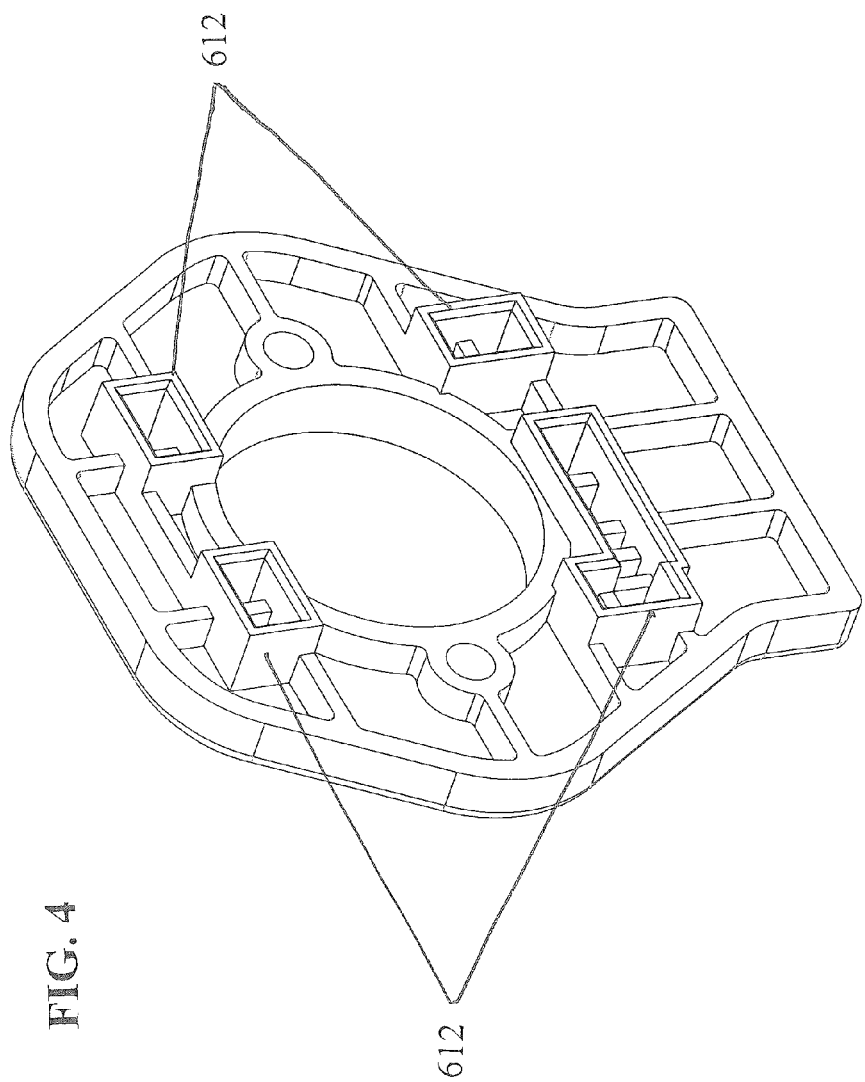
FIG. 4 depicts positioning structures within the inside of the cover.

The cover 610 is provided with a plurality of positioning structures (collectively designated "612" on FIG. 4) which restrict the movement of the various elements with the receptacle 100. In the preferred embodiment, these positioning structures 612 are shaped to constrain the movement of the circuit breakers 200, and as a result, are in the shape of box-like recesses, as is shown in FIG. 4. Thus, the positioning structures 612 limit movement in all 3 axes.

Figure 7:
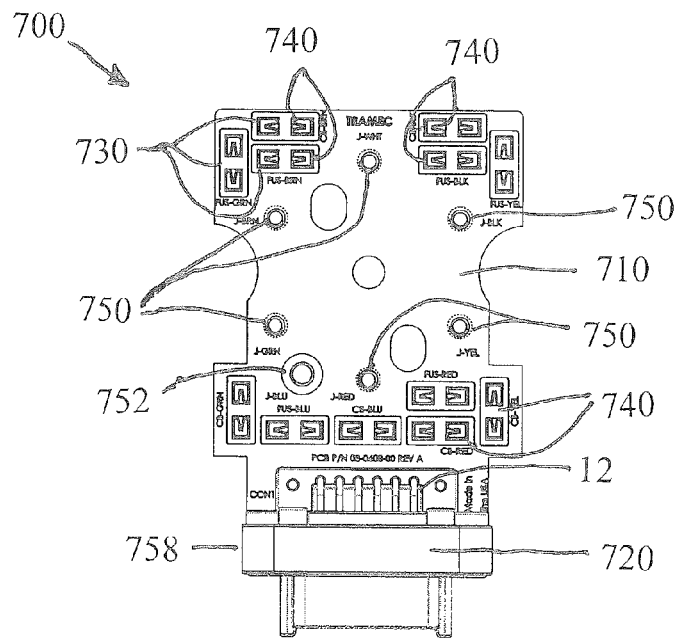
FIG. 7 depicts the printed circuit board assembly.

The interface between the third party harness connector (noted as Deutsch DT13-12PA and shown as an exemplary wiring interface 720 in FIG. 7) and the internal circuits of container 600 is via connection to a printed circuit board (PCB). The Deutsch connector for through-hole PCB mounting is commercially available.

Circuits are routed from the various pins of the harness connector to the appropriated terminal of the J560 socket connector via tracings on the PCB. An exemplary version of such terminal routing is illustrated with respect to terminals 810 of connector 800 shown in FIG. 9. One set of tracings leads to the common ground terminal of the SAE J560 socket. The circuit tracings from the harness connector to the remaining six terminals of the SAE J560 socket are interrupted by two separate blade style "fuse holders." The fuse holders that are electrically in a position closest to the harness connector are fitted with a compatible blade style Type I (auto reset) circuit breaker of the proper amperage rating. Installation of the circuit breaker in this manner removes the potential for misconnection, and provides the desired electrical protection from overloads.

The second blade style fuse holder in each circuit is electrically positioned between the circuit breaker holder and the connection to the J560 socket. The design specifies a commercially available fuse of a slightly higher load capacity compared to the circuit breaker in the same circuit. Fuses react faster than do circuit breakers to extremely high overloads, such as those created by a short circuit, thereby protecting the circuit from these loads. This design also places a fuse of the proper amperage rating in a position to provide redundant circuit overload protection in the event of a catastrophic failure of the circuit breaker due to welding of the circuit breaker contacts in a closed position. The circuit tracings are then mechanically and electrically connected to the proper terminals of the J560 socket through terminal assemblies with their position relative to the J560 socket pin pattern secured by an insulator.

As FIG. 5 illustrates, the cover 610 is provided with a connector opening 613, which in the preferred embodiment is circular in shape. As FIG. 5 also illustrates, the connector opening 613 within the cover 610 is dimensional to accommodate a plurality of connector leads (collectively designated "810") which extend from a connector 800. The connector 800 is configured to accept a plurality of pins, and is provided herein in the form of a plurality of pins.

FIG. 7 depicts the circuit board assembly 700 in greater detail. As illustrated therein, the circuit board assembly 700 is provided with a printed circuit board 710, a wiring interface 720, a fuse holder 730 and a circuit breaker holder 740. Formed within the printed circuit board 710 is a plurality of through-holes 750, each of which is shaped to accept a broaching stud 751 (shown in FIG. 1)

Figure 8:
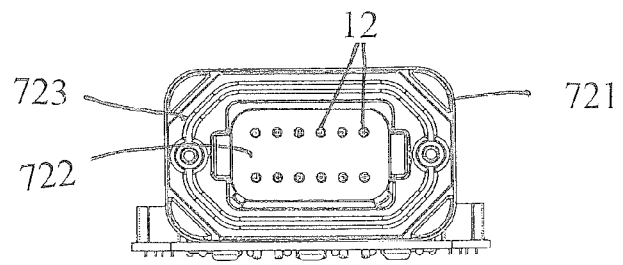
FIG. 8 depicts a wiring interface that includes a thermoplastic shell, a thermoplastic wedge, and a silicone rubber grommet.

The wiring interface 720 is a connector configured to accept a cable or a wiring harness and provided with a thermoplastic shell 721, a thermoplastic socket 722, and a silicone rubber grommet 723, as is shown in FIG. 8. Provided with copper alloy contacts (preferably 12 as shown in FIG. 7 and FIG. 8), the wiring interface 720 is configured to accept a plurality of pins from the cable (or wiring harness). The printed circuit board 710 is provided with 2 ounce copper traces (collectively designated "760" in FIG. 9) that carry 10 amps of direct current, with a grounding trace carrying up to 60 amps of direct current. In an alternative embodiment, the grounding trace may be replaced by a grounding cable.

Figure 9:
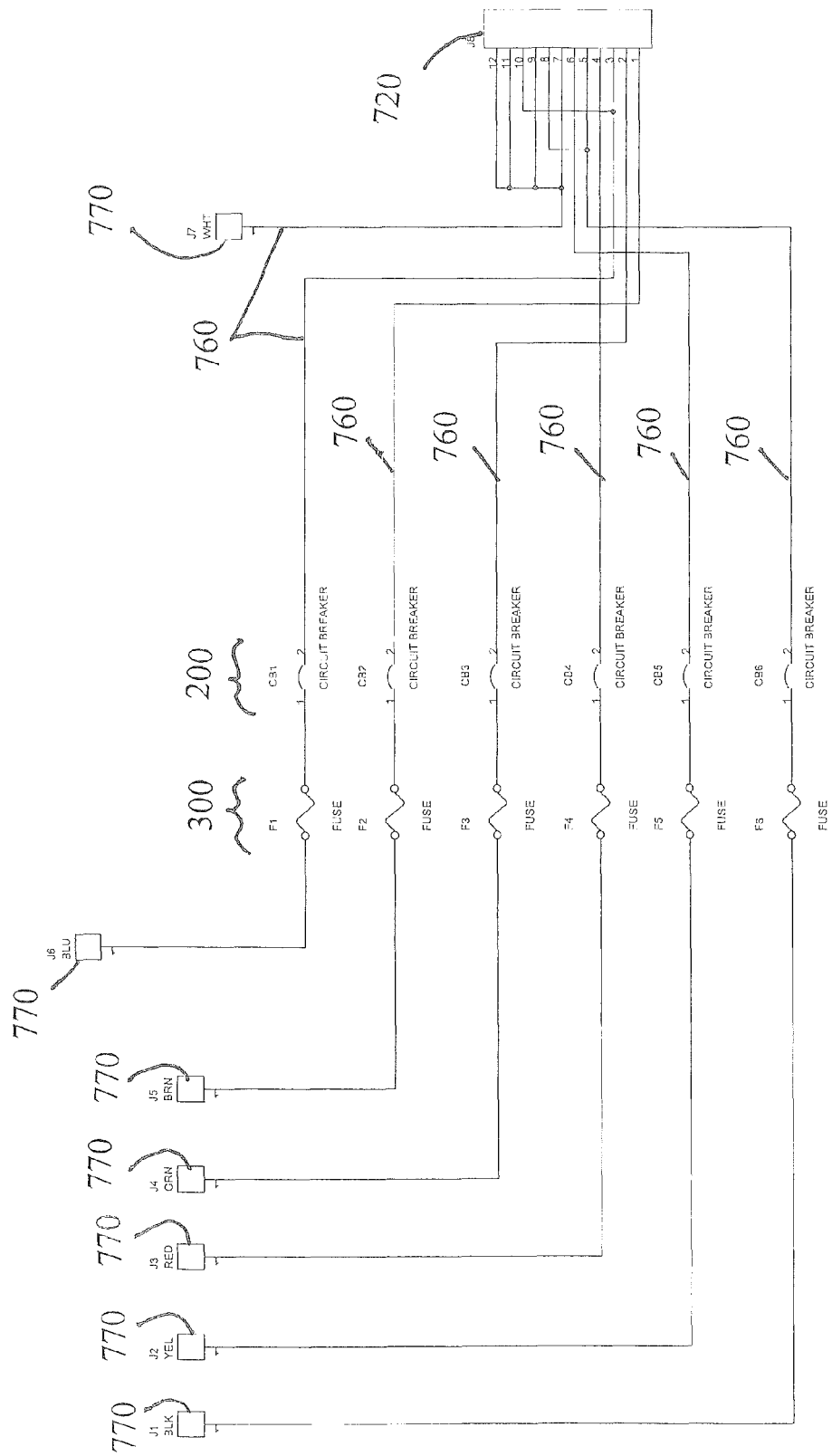
FIG. 9 is a wiring diagram showing the wire routing.

In the preferred embodiment each circuit breaker 200 is placed in series with each fuse 300, with the circuit breaker 200 positioned within the circuit so that it is located closer to the wiring interface 720 than the fuse 300, as is shown in the wiring diagram in FIG. 9. As FIG. 9 also illustrates, at each of the traces 760 begins the wiring interface 720, and extends to a termination (collectively designated "770") which in the preferred embodiment, is in the form of one or more broaching studs 751 or at least one broaching nut 752. In the preferred embodiment, at least one of the traces 760 terminates at a broaching nut 752. Before terminating, each trace 760 extends to a circuit breaker 200, then a fuse 300, and then to a termination 770.

As noted above, the circuit board assembly 700 is provided with a plurality of terminators 770 which are in the form of broaching studs 751. These broaching studs 751 cooperate with the terminal assembly 500 (and thus, the terminations 770 of the tracings 760 on the printed circuit board 710 also cooperate with the terminal assembly 500).

Figure 10:
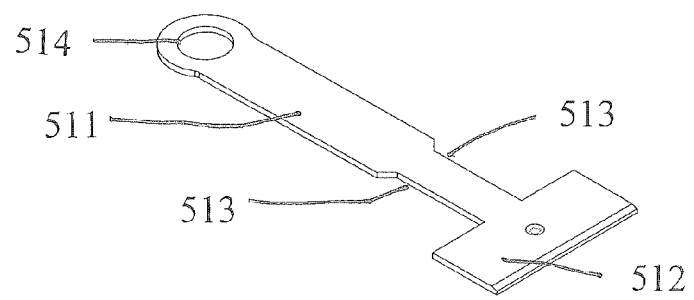
FIG. 10 depicts a terminal.
Figure 11:
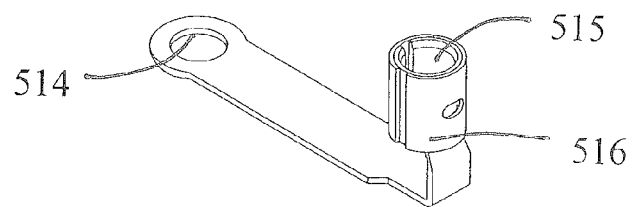
FIG. 11 depicts a terminal with a pin acceptor and through-hole.

In the presently preferred embodiment, the terminal assembly 500 is provided with a plurality of terminals (collectively designated "510"). Each of the terminals 510 is a flat stamping 511 as depicted in FIG. 10, that includes a "T-portion" 512 a cut-out 513, and a through-hole 514. The stamping 511 is bent at the cut-outs 513 and rolled to form a pin acceptor 515, as is shown in FIG. 11 and FIG. 1. The through-hole 514 is dimensioned to accept a broaching stud 751 while the pin acceptor 515 is dimensioned to cooperate with the sleeve 400 and the pins on connector 800. The pin acceptor 515 is surrounded by a spring metal sleeve [516] to ensure optimum conductive contact between the pin acceptor and the pin of the mating connector 800.

FIG. 1 depicts the sleeve which, in the preferred embodiment, is fabricated from an insulating material, such as a plastic nylon. As FIG. 1 illustrates, the sleeve 400 is generally circular in shape and provided with a plurality of insulated holes (collectively designated "411" on FIG. 6) for the pins of a connector 800. The sleeve 400 is also provided with a plurality of fastening holes 412 which are shaped for a fastener (preferably bolts 413).

Finally, industry standards have been established that assign color codes related to the function of the various electrical circuits on the heavy transport trailer. The circuit color code associated with each fuse and breaker is printed on the printed circuit board adjacent to the appropriate blade style fuse or breaker holder. A printed color coded guide mapping the fuse and circuit breaker locations will be inserted when the assembly is closed.

While this invention has been particularly shown and described with references to embodiments thereof, it will be understood by those skilled in the art that various changes in form and details may be made therein without departing from the spirit and scope of the invention as defined by the appended claims.

What is claimed is:

1. A receptacle for establishing electrical connection between a tractor and a trailer, comprising:
    a trailer connector for connecting the trailer to the tractor via engagement with a mating tractor connector and having assigned circuits and a common ground terminal;
    a container having a cover cooperating with a base that extends generally orthogonally relative to a plate;
    a circuit board assembly including a printed circuit board, a wiring interface, a fuse holder and a circuit breaker holder; and
    at least one terminal assembly in electrical communication with the trailer connector;
    wherein circuits are routed from pins of the wiring interface to corresponding terminals of the trailer connector via one or more circuit tracings on the printed circuit board.

2. The receptacle of claim 1, wherein the cover includes a connector opening that accommodates a plurality of connector leads extending from the trailer connector.

3. The receptacle of claim 2, further including a sleeve fabricated from an insulating material and provided with a plurality of insulated holes to accommodate the connector leads extending from the trailer connector.

4. The receptacle of claim 2, wherein the wiring interface includes a harness connector configured to accept a wiring harness.

5. The receptacle of claim 4, wherein an opening that accommodates the harness connector is provided in one of the base or the cover.

6. The receptacle of claim 4, further including a plurality of circuit breakers and a plurality of fuses.

7. The receptacle of claim 6, wherein the printed circuit board includes indicia associated with each circuit breaker and each fuse.

8. The receptacle of claim 6, wherein the cover includes one or more positioning structures that restrain movement of the circuit breakers relative to the receptacle.

9. The receptacle of claim 6, wherein each circuit breaker is placed in series with each fuse.

10. The receptacle of claim 9, wherein one set of circuit tracings leads to the common ground terminal of the connector, and circuit tracings from the harness connector to the assigned circuits of the trailer connector are interrupted by one or more fuse holders.

11. The receptacle of claim 10, wherein a circuit breaker is positioned so that it is located closer to the wiring interface than a fuse.

12. The receptacle of claim 11, wherein the circuit breaker is a blade style SAE Type I circuit breaker.

13. The receptacle of claim 12, wherein a fuse is positioned between the circuit breaker and the trailer connector that is a fuse of a slightly higher load capacity compared to the circuit breaker.

14. The receptacle of claim 13, wherein the circuit tracings are mechanically and electrically connected to corresponding terminals of the connector through the terminal assembly.

15. The receptacle of claim 14, wherein the circuit board assembly includes a plurality of terminators in cooperation with the terminal assembly.

16. The receptacle of claim 1, further including a gasket to ensure a water-tight closure of the container.

17. The receptacle of claim 1, wherein the plate includes one or more bins shaped to retain at least one of a fuse and a circuit breaker thereby.

18. The receptacle of claim 1, wherein the connector comprises a J560 socket connector.

* * * * *

UNITED STATES PATENT AND TRADEMARK OFFICE
CERTIFICATE OF CORRECTION

PATENT NO. : 8,376,758 B2
APPLICATION NO. : 12/882042
DATED : February 19, 2013
INVENTOR(S) : Sell Page 1 of 1

It is certified that error appears in the above-identified patent and that said Letters Patent is hereby corrected as shown below:

Column 5:
Line 15, delete "[516]" and insert -- 516 --.

Signed and Sealed this
Second Day of April, 2013

Teresa Stanek Rea
*Acting Director of the United States Patent and Trademark Office*